LOW IMPEDANCE VOLTAGE REGULATING CIRCUIT

Filed Sept. 12, 1963

INVENTOR.
DALTON L. KNAUSS
BY McLaughlin & Cahill
ATTORNEYS 3,263,092

LOW IMPEDANCE VOLTAGE REGULATING CIRCUIT

Dalton L. Knauss, Scottsdale, Ariz., assignor to Dickson Electronics Corporation Filed Sept. 12, 1963, Ser. No. 308,562
6 Claims. (Cl. 307—88.5)

My invention relates to a zero incremental impedance voltage regulating semiconductor element and a voltage regulating system employing such elements. The present application is a continuation-in-part of my previously filed application Serial No. 171,764 filed February 7, 1962, now abandoned.

Because of known limitations of voltage regulating circuits employing voltage regulator tubes, semiconductor diodes have come into use in voltage regulating circuits, but such semiconductor diodes normally exhibit positive incremental impedance characteristics in their breakdown (zener) regions. Perfect voltage regulation is not attained under such circumstances. By utilizing a specifically constructed semiconductor diode of the type described and claimed in co-pending application Serial No. 289,352 filed June 20, 1963, by Donald C. Dickson and assigned to the assignee of the present invention, I have found that a voltage regulating circuit can be constructed having substantially zero incremental impedance over a wide range current. In that application a diode was described and claimed wherein a semiconducting device was provided having two layers of one conductivity type separated by a narrow layer of an opposite conductivity type, and wherein the intermediate semiconducting layer is of thickness less than a minority carrier diffusion length. The volt-ampere characteristic derivable through such a construction folds back upon itself to yield a negative resistance region, and a region where the small signal zener impedance is zero. The present invention utilizes a diode of that description and compensates for the negative characteristic thereof to provide a substantially zero incremental impedance and yield an improved voltage regulation system.

The principal object of my present invention is the provision of an improved voltage regulating means having low to zero incremental impedance.

Another object of my invention is the provision of an improved accurate voltage regulating circuit employing a semiconductor diode as the principal regulating element.

It is still a further object of the present invention to employ in a voltage regulating circuit a negative incremental impedance semiconductor device compensated to produce a circuit having substantially zero incremental impedance and providing essentially perfect voltage regulation.

Other objects and features of my invention will become apparent to those skilled in the art as the description thereof proceeds. Referring to the drawings.

Figure 1:
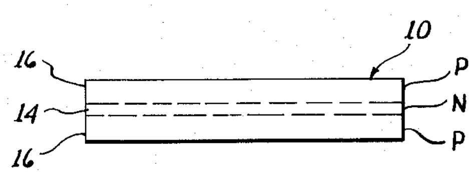
FIG. 1 is a schematic illustration of a semiconducting device having a negative impedance characteristic in the breakdown region used in the system of the present invention.

Referring to FIG. 1, a semiconducting device 10 is shown having two P layers 16 separated by a thin N layer 14. In producing the diode 10 shown in FIG. 1, and particularly in determining the relative thickness of the layers 14 and 16, conventional diffusing, alloying, or other well-known practices may be used. In order to realize an element 10 having a negative incremental impedance in the breakdown region it is necessary that the N thickness have a dimension less than the minority carrier diffusion length in said region. In actual practice it has been found that the N region will be between about one ten-thousandths to several thousandths of an inch in thickness, depending on the minority carrier diffusion length. If donor impurities are diffused from both sides to produce the two P regions 16, an essentially electrically symmetrical device results; that is, the characteristics of the diode will be the same for either direction of current.

Figure 2:
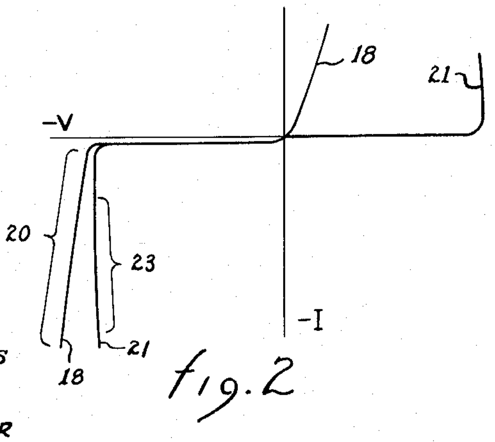
FIG. 2 is a comparison of the volt-ampere characteristic of a typical zener diode in the breakdown region and of a diode of the type illustrated in FIG. 1 having a negative impedance characteristic.

Referring to FIG. 2, a typical volt-ampere characteristic 18 is shown for a zener diode in the breakdown region. It is well-known that as the voltage across the PN junction of the zener diode is decreased, the junction exhibits a breakdown and increasing the voltage amplitude results in only a slight increase in current. The characteristic 18 of FIG. 2 illustrates this phenomena and, by inspection thereof, it may be seen that the characteristic exhibits a positive slope, or positive incremental impedance, throughout the region 20 of the characteristic. The characteristic curve 21 illustrates a typical negative incremental impedance diode constructed in accordance with the teachings enumerated above, and described more fully and claimed in said co-pending application Serial No. 289,352. The behavior of the negative incremental impedance diode is identical to the conventional zener diode until the breakdown region of the reverse biased junction is reached; after breakdown, a characteristic curve actually folds back into a negative sloping portion 23 representing a negative impedance. It will be understood by those skilled in the art that the characteristic curves of FIG. 2 are shown for negative values of resistance and current in accordance with the conventional method for illustrating volt-ampere characteristics of zener diodes. It will be obvious that a forward biased zener diode will exhibit a positive incremental impedance whereas the negative incremental impedance diode, unlike a conventional zener diode, is symmetrical and will exhibit substantially the identical characteristic for currents in the opposite direction.

Figure 3:
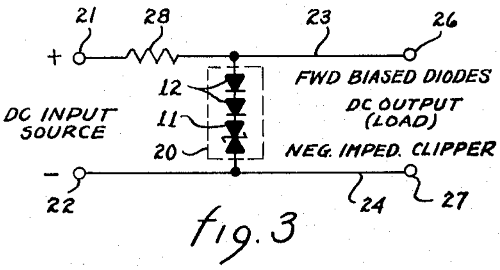
FIG. 3 is a schematic illustration of a voltage regulating system constructed in accordance with the teachings of the present invention.

Referring to FIG. 3, a circuit is shown in which a pair of terminals 21 and 22 are connected to the positive and negative sides respectively of a D.C. input source (not shown) representing a source of unregulated D.C. voltage. Conductors 23 and 24 lead to terminals 26 and 27 respectively which are connected to a load (not shown) and represent the output terminals of a voltage regulating circuit. A current limiting resistor 28 may be connected in series with one of the input terminals to protect the voltage regulating device of the present invention. A negative incremental impedance diode 11 is shown as connected in series with two forwardly connected positive incremental impedance diodes 12. The series circuit is connected across the lines 23 and 24 in parallel relation to the load in the manner shown. The forward biased diodes 12 and the negative incremental impedance diode 11 are encapsulated as indicated in FIG.

3 by the dotted line 20. The circuit shown in FIG. 4 is similar to the circuit shown and described in connection with FIG. 3 but it employs a zener type diode 28.

Figure 5:
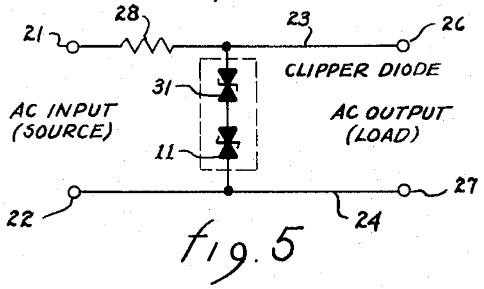
FIG. 5 is another modification of the system shown in FIG. 3.

FIG. 5 shows a circuit particularly adapted for controlling or regulating A.C. voltages. As shown in FIG. 5, a clipper diode 31 is employed with positive incremental impedance characteristics to compensate for the negative incremental impedance of the diode 11 regardless of the direction of the circuit polarity. The clipper diode 31 is schematically illustrated in FIG. 5 as a pair of back-to-back diodes; it is well-known in the art that two zener diodes may be constructed to form a unitary structure to thereby provide a forward and a negative biased PN junction regardless of the direction of current flow. With this type of construction, illustrated at 31, the diode acts as a clipper and passes current in either direction only after the breakdown voltage of the reverse biased junction has been reached. The action of the clipper diode 31 is similar to the action achieved by placing two zener diodes in series with the anodes or cathodes connected.

Figure 4:
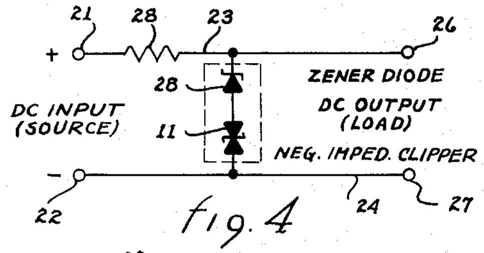
FIG. 4 is a modification of the system shown in FIG. 3.
Figure 6:
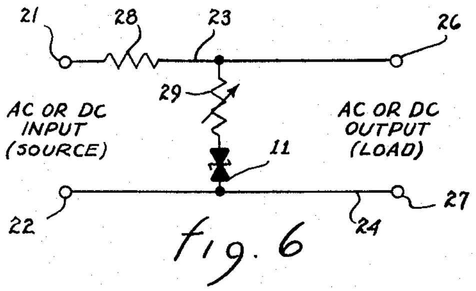
FIG. 6 is still another modification of the system shown in FIG. 3.

In FIG. 6 I show a circuit with the same general features shown in FIGS. 3 and 4 but in which I employ a resistor 29 in place of a semiconducting element to compensate for the negative incremental impedance characteristics of the diode 11. It is known that an ordinary resistor has positive incremental impedance characteristics and I have shown the resistance as variable to indicate that it can be adjusted to exactly compensate the diode 11. One of the characteristics of the circuit of FIG. 6 is that it can be used as a voltage regulating circuit for either A.C. or D.C. voltage. It has already been noted that the characteristics of the diode 11 may be essentially electrically symmetrical and, of course, so also are the characteristics of the resistance 29. It is because of such essential electrical symmetry that this circuit can be employed for both A.C. and D.C. control without change. However, the resistance does not yield a compensating impedance that matches the negative impedance of diode 11 to the extent provided by the circuits of FIGS. 3, 4, and 5.

Figure 7:
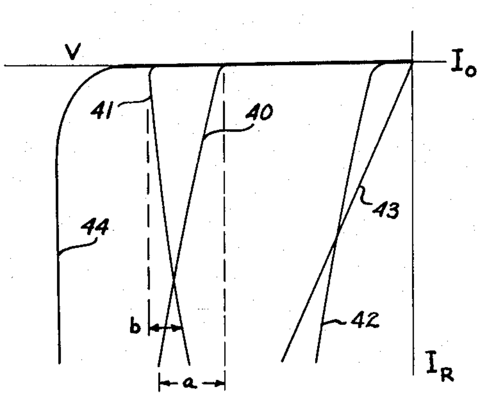
FIG. 7 shows a plurality of curves useful for describing the operation of the present invention.

The operation of the above circuits employing the regulating system of the present invention may be described with the aid of the curves shown in FIG. 7. Referring to FIG. 7, the curve 40 illustrates a representative zener diode characteristic exhibiting a positive incremental impedance. The curve 41 represents the volt-ampere characteristic of a negative incremental impedance diode of the type shown at 11 in the preceding circuits. It may be noted that the curve exhibits a negative incremental impedance after breakdown. A forward biased PN junction exhibits a positive incremental impedance as illustrated by the curve 42; similarly, a resistance exhibits a positive incremental impedance and the impedance is linear as illustrated by the curve 43. The combination of these various elements as illustrated in FIGS. 3 through 6 may readily yield a characteristic that, as shown by the curve 44 FIG. 7, represents a substantially zero incremental impedance. For example, the utilization of a zener diode in series with the negative incremental impedance diode may be presented in FIG. 7 as the combination of curves 40 and 41. The absolute addition of the voltage magnitudes of curves 40 and 41 will not provide a precisely vertical, or zero slope, curves as illustrated in FIG. 44. However, a combination of a variety of elements may be utilized to achieve this end. For example, at a reference current $I_R$ it may be noted that the compensation provided by the zener diode is proportional to the distance "*a*" while the negative impedance is only proportional to "*b*." The ultimate result of the combination of the elements having characteristics 40 and 41 would be a device having a characteristic that is not representative of a zero incremental impedance; however, by connecting two or more negative incremental impedance devices in series with a single positive incremental impedance device, it is possible to achieve substantially zero incremental impedance. Further, forward biased diodes may be inserted in series with reverse biased diodes and the negative incremental impedance diode to achieve substantial zero incremental impedance. It may be noted that the curves of FIG. 7 are schematic and are not to scale; further, the slopes of the respective curves have been greatly exaggerated to facilitate the description thereof. Another advantage attained by the utilization of zener diodes or forward biased diodes to compensate for the negative incremental impedance diode is the fact that the characteristics of the respective diodes are not straight lines; rather, the respective diodes have characteristics that approach logarithmic curves and thus, the utilization of the positive incremental devices to compensate for the negative incremental impedance device results in the compensation of one logarithmic type characteristic by another thus yielding a more nearly zero incremental impedance.

Figure 8:
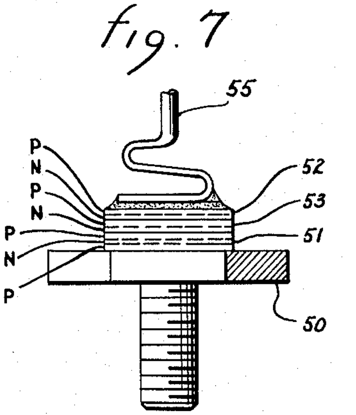
FIG. 8 is an elevational view, enlarged and partly schematic, showing one form of semiconductor unit that may be employed in the construction of the system of the present invention.

Referring now to FIG. 8, I show a complete voltage regulating device constructed in accordance with the teachings of the present invention. The device includes a conventional heat sink type of support 50 to which has been attached, by conventional means, the negative incremental impedance diode of the type described in connection with FIG. 1. The negative incremental impedance device 51 is shown in FIG. 2 as a PNP device. It will be obvious to those skilled in the art that an NPN type of structure may be utilized in place of the PNP type illustrated. In intimate contact with the negative incremental impedance diode are two PN junctions 52 and 53. These PN junctions are in ohmic contact with each other and the PN junction 53 is in ohmic contact with the negative incremental impedance diode 51. The entire structure of FIG. 8, including a lead-in electrode 55 is encapsulated in a glass, ceramic, or metal envelope (not shown) to provide a single unitary structure that conveniently may be placed in a circuit such as that shown in FIG. 3 to provide a convenient, dependable, and accurate voltage regulating circuit. The two PN junctions shown in FIG. 8 are forward biased, and thus, the impedance compensation may be illustrated by reference to FIG. 7 wherein two characteristic curves of the type shown at 42 would be combined with a negative impedance characteristic of the type shown at 41 to provide an over-all volt-ampere characteristic such as shown at 44. Thus, the voltage regulating device of FIG. 8 presents a substantially zero incremental impedance to thereby provide essentially perfect voltage regulation over a given range of operating current.

It will be obvious to those skilled in the art that many modifications of the present invention may be made without departing from the spirit and scope thereof.

Accordingly, what I claim as new and desire to secure by Letters Patent of the United States is:

1. In a voltage regulating circuit: a semiconductor element having an intermediate layer of one conductivity type and oppositely disposed layers of opposite conductivity type; said intermediate layer having a thickness less than the minority carrier diffusion length in the region comprising said intermediate layer to thereby provide negative incremental impedance; and a positive impedance element in series with said semiconductor element and having a positive incremental impedance to compensate for said negative incremental impedance.

2. A voltage regulating circuit as defined in claim 1 wherein said positive impedance element is a variable resistor.

3. In a voltage regulating circuit: a semiconductor element with an intermediate thin layer of one conductivity type and oppositely disposed layers of opposite conductivity type; said intermediate layer having a thickness less than the minority carrier diffusion length in the region comprising said intermediate layer to thereby provide negative incremental impedance; and a positive impedance element in series with said semiconductor element to compensate for said negative incremental impedance and form a voltage regulating circuit of substantially zero incremental impedance.

4. In a voltage regulating circuit: a semiconductor element with an intermediate thin layer of one conductivity type and oppositely disposed layers of opposite conductivity type; said intermediate layer having a thickness less than the minority carrier diffusion length in the region comprising said intermediate layer to thereby provide negative incremental impedance; a second semiconductor element with an intermediate layer of one conductivity type and oppositely disposed layers of opposite conductivity type; said intermediate layer of said second conductor element having a thickness greater than the minority carrier diffusion length in the region comprising said intermediate layer to thereby provide a clipper type diode having a positive incremental impedance; and means electrically connecting said first and second semiconductor elements.

5. In a voltage regulating circuit: a semiconductor element with an intermediate thin layer of one conductivity type and an oppositely disposed layer of opposite conductivity type; said intermediate layer having a thickness dimensioned less than the minority carrier diffusion length in the region comprising said intermediate layer to thereby provide negative incremental impedance; a second semiconductor element having a layer of one conductivity type joined to a layer of opposite conductivity type to form a zener diode; and means electrically connecting said zener diode in series with said first semiconductor element.

6. In a voltage regulating circuit: a first semiconductor element with an intermediate thin layer of one conductivity type and oppositely disposed layers of opposite conductivity type; said intermediate layer having a thickness dimensioned less than the minority carrier diffusion length in the region comprising said intermediate layer to thereby provide negative incremental impedance; a second semiconductor element having a layer of one conductivity type joined to a layer of opposite conductivity type to form a PN junction; and means connecting said first and second semiconductor elements in series.

No references cited.

ARTHUR GAUSS, *Primary Examiner.*

R. H. EPSTEIN, *Assistant Examiner.*